C. A. MARIEN.
VEHICLE WHEEL.
APPLICATION FILED OCT. 3, 1921.
1,424,314.
Patented Aug. 1, 1922.
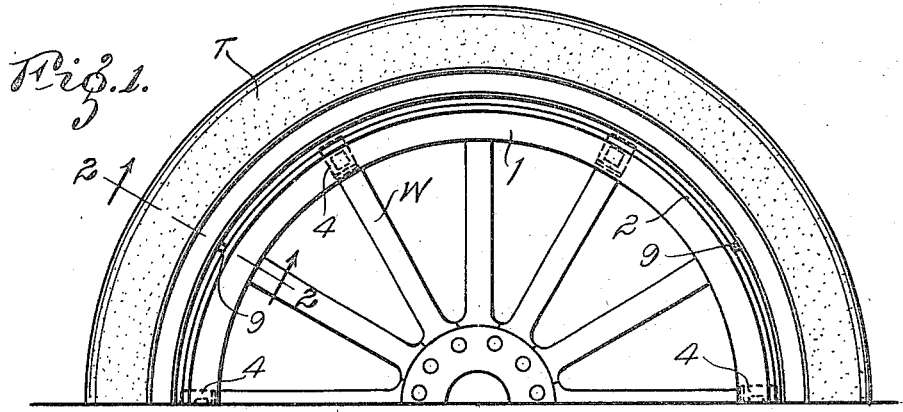
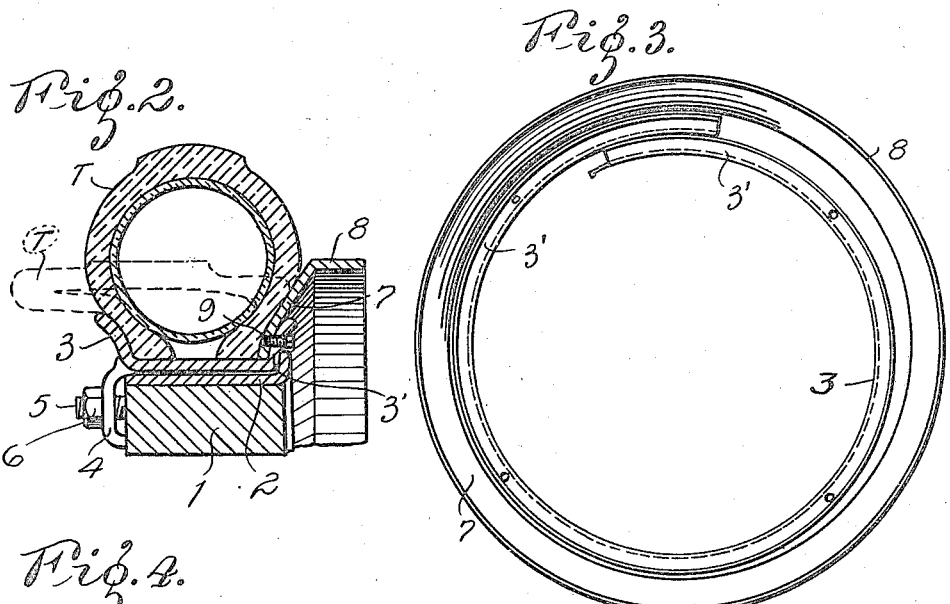
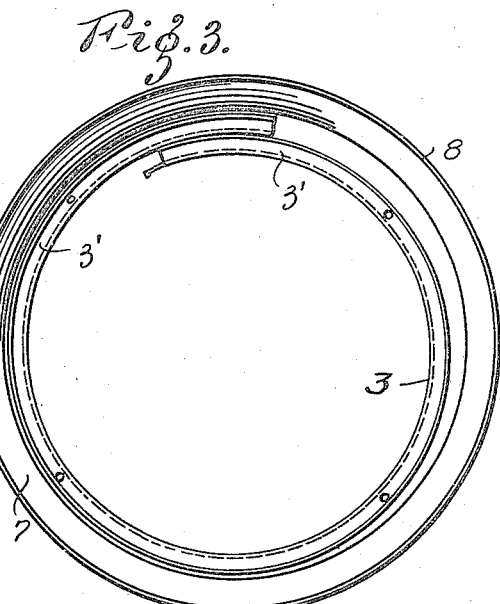
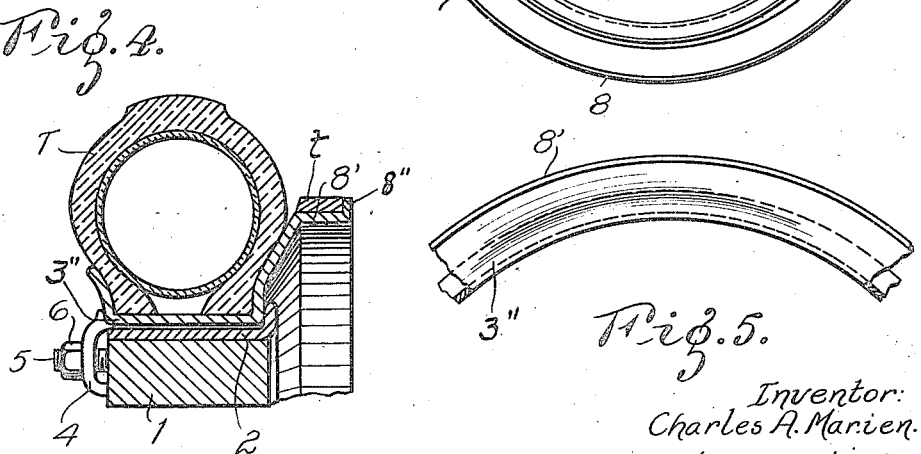
Inventor:
Charles A. Marien.
By Harry A. Barnes
Attorney.

UNITED STATES PATENT OFFICE.

CHARLES A. MARIEN, OF ST. LOUIS, MISSOURI.

VEHICLE WHEEL.

1,424,314.   Specification of Letters Patent.   Patented Aug. 1, 1922.

Application filed October 3, 1921. Serial No. 504,882.

*To all whom it may concern:*

Be it known that I, CHARLES A. MARIEN, a citizen of the United States, residing at St. Louis, State of Missouri, have invented certain new and useful Improvements in Vehicle Wheels, of which the following is a specification.

My invention has relation to improvements in vehicle wheels, and consists in the novel details of construction more fully set forth in the specification and pointed out in the claim.

The object of the present invention is to provide an automobile wheel having a pneumatic tire with an auxiliary tread in case of accidental deflation of the tire, so that the automobile may be run a limited distance without changing the tire and without injury to it.

As is well known, pneumatic tires are subject to punctures and blowouts at most inopportune times, and under the present practice when a tire is thus impaired it is necessary to repair it or replace it immediately, since the weight of an automobile on a soft tire will quickly destroy it. By my invention this difficulty is overcome, and the automobile may be run limited distances on a deflated tire without injury to it, and the tire replaced at a more convenient time.

The manner in which these and other advantages are obtained will be better apparent from a detailed description of the invention in connection with the accompanying drawings, in which—

Figure 1 is a side elevation of an automobile wheel with my invention applied thereto; Fig. 2 is a transverse section through the tire and wheel on the line 2—2 of Fig. 1; Fig. 3 is a side elevation of the split rim showing rim contracted to receive the auxiliary tread; Fig. 4 is a cross-sectional view of a modified form of the invention; and Fig. 5 is a face view of the rim shown in Fig. 4.

Referring to the drawings, W represents an automobile wheel, and 1 and 2 the felloe and felloe band respectively of the wheel. T represents a pneumatic tire mounted on a split demountable rim 3, the rim being fastened on the felloe band by wedges 4 secured on studs 5 by nuts 6 as well understood in the art. My improvement consists in a band 7 (preferably made of pressed steel) provided with an auxiliary tread 8 projecting outwardly from the band, said band being positioned over the rim 3 and held between the flange 3' of said rim and tire bead by the outward pressure of the tire. The band 7 is placed over the split rim in the same manner as the tire, i. e., by contracting the rim to a smaller diameter (Fig. 3) and slipping the band over the contracted rim, after which it expands against both tire and band. When the wheels of an automobile are provided with bands 7, and one of the tires becomes deflated, the tread 8 of said band will bear on the ground and support the car. Should it be inconvenient to change tires at once (on account of bad weather or limited time) the car may be run on the tread 8 of the band 7 without injury to the tire, as the weight of the car is not on the tire, but on the auxiliary tread. The band 7 is secured to the flange of the rim 3 by means of cap screws 9 so that it will not wobble on the rim when the tire T has been deflated by a puncture.

Obviously the invention may be modified (as shown in Fig. 4) by forming an auxiliary tread 8' integral with the rim 3'', the flange of the rim being extended outwardly for this purpose. Then, too, if desired, a resilient tire *t* may be placed on the tread 8', the tread having a terminal flange 8'' on the outer edge to keep the tire *t* in place.

Having described my invention, I claim:

A vehicle wheel provided with a flanged detachable split rim, a pneumatic tire on said rim, and a solid band positioned over the rim between one flange thereof and the tire, the tire being inflated against the band said band having a tread projecting laterally therefrom and means for holding the band against movement when the tire becomes deflated.

In testimony whereof I hereunto affix my signature.

CHARLES A. MARIEN.